Sept. 4, 1962 R. B. WILLIAMS, JR 3,052,409
READ OUT EQUIPMENT FOR ELECTRONIC COUNTERS
Filed June 21, 1956 5 Sheets-Sheet 1
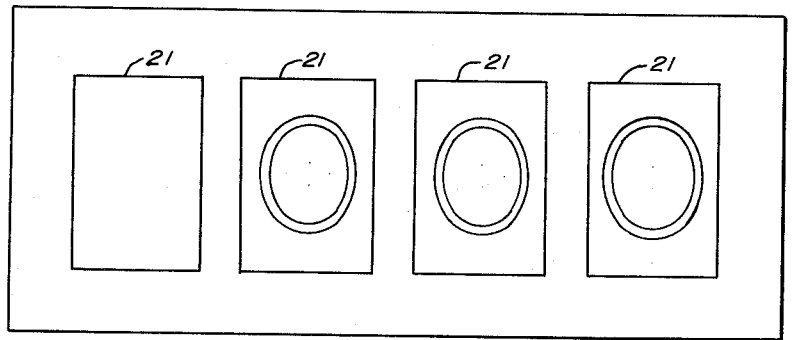
Fig. II
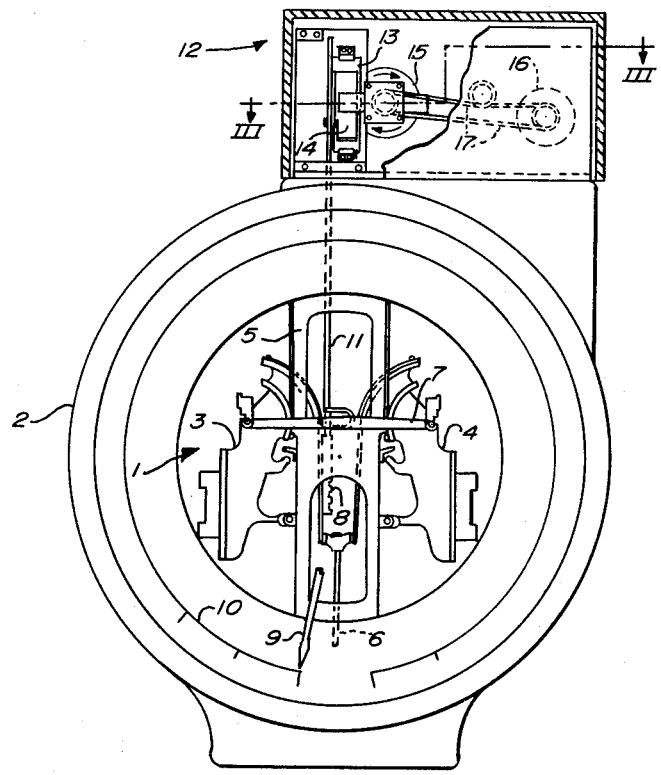
Fig. I
INVENTOR.
ROGER B. WILLIAMS JR.
BY
Marshall, Marshall & Heasting
ATTORNEYS

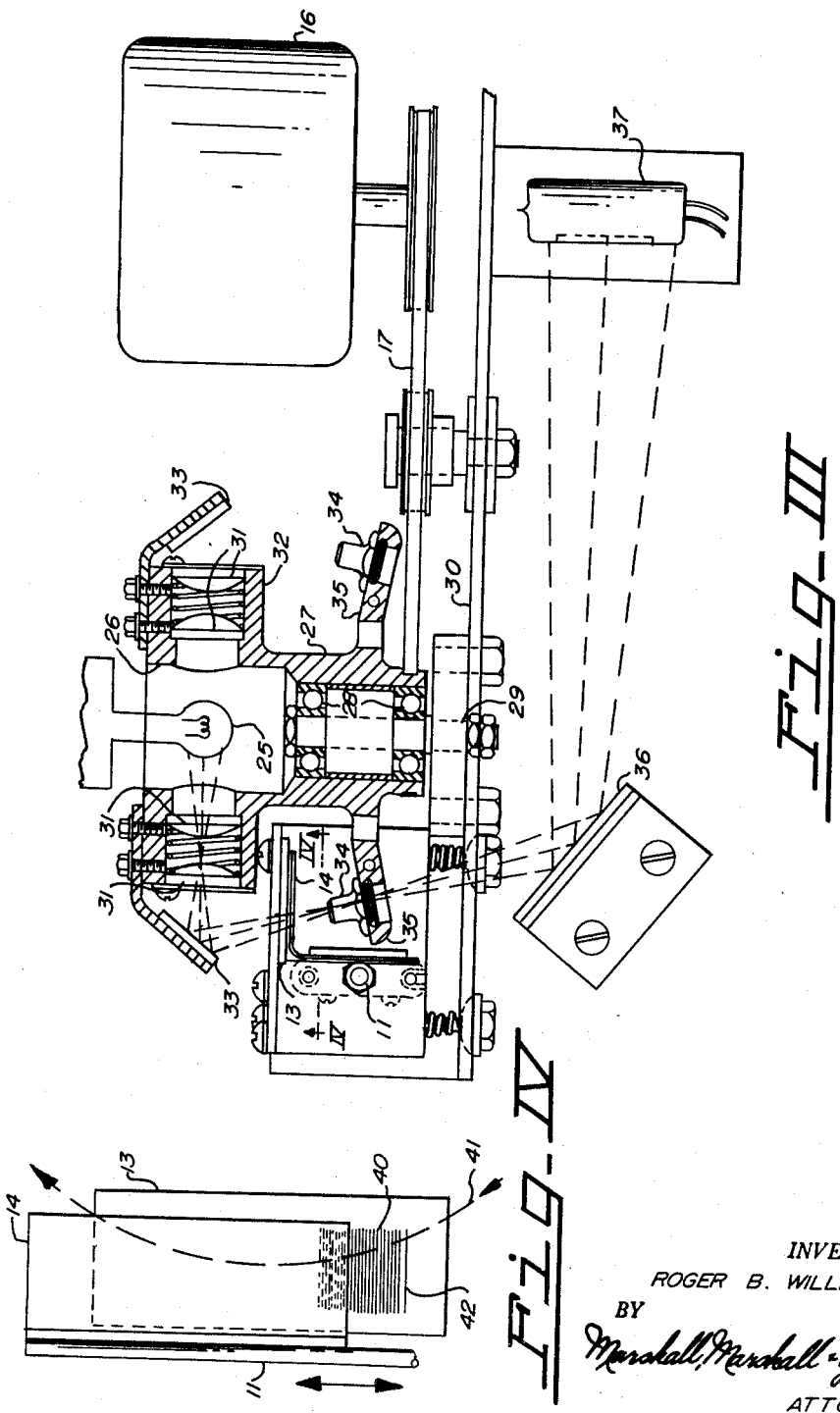

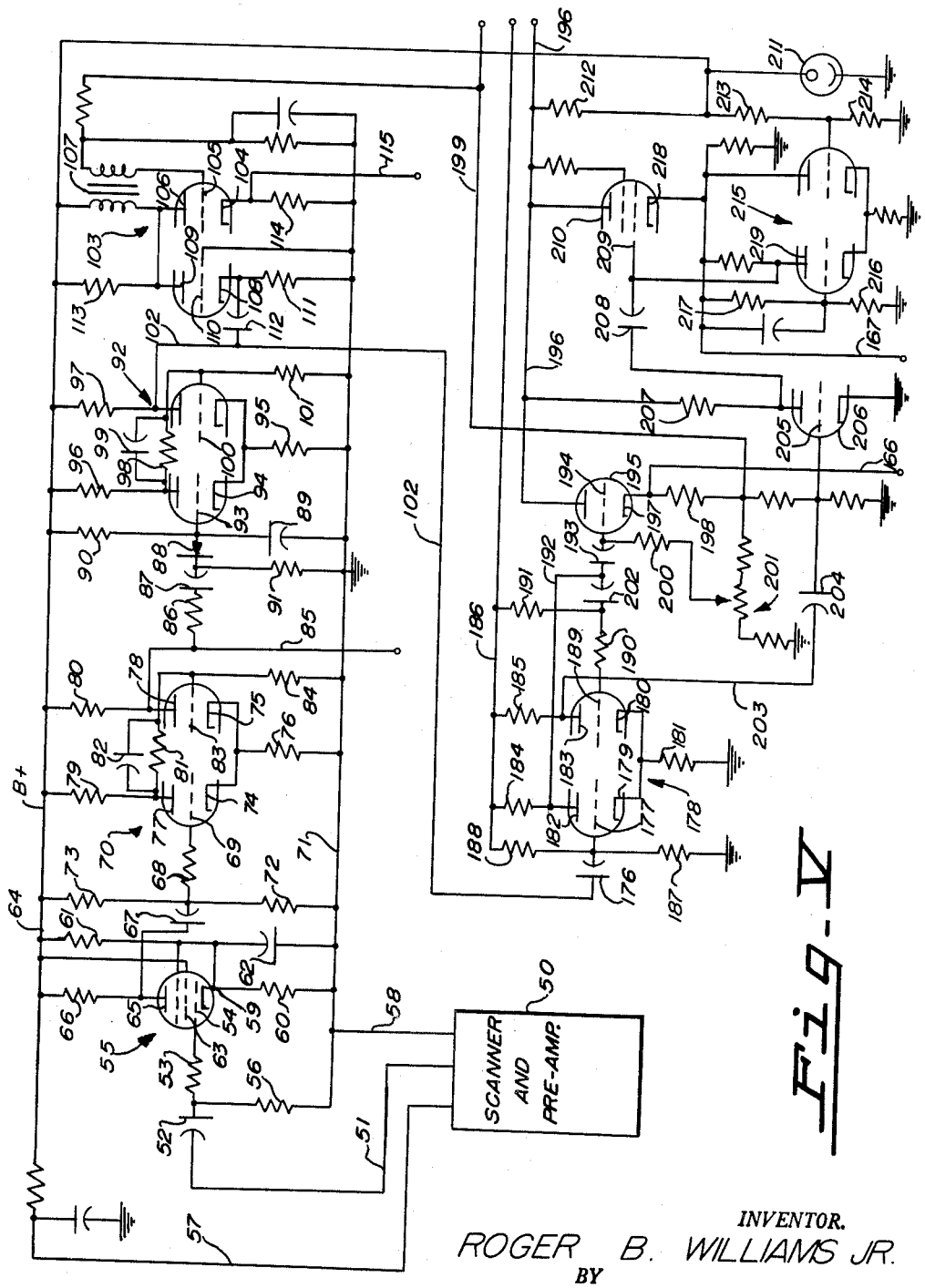
Fig. V
INVENTOR.
ROGER B. WILLIAMS JR.
BY
Marshall, Marshall & Yeasting
ATTORNEYS

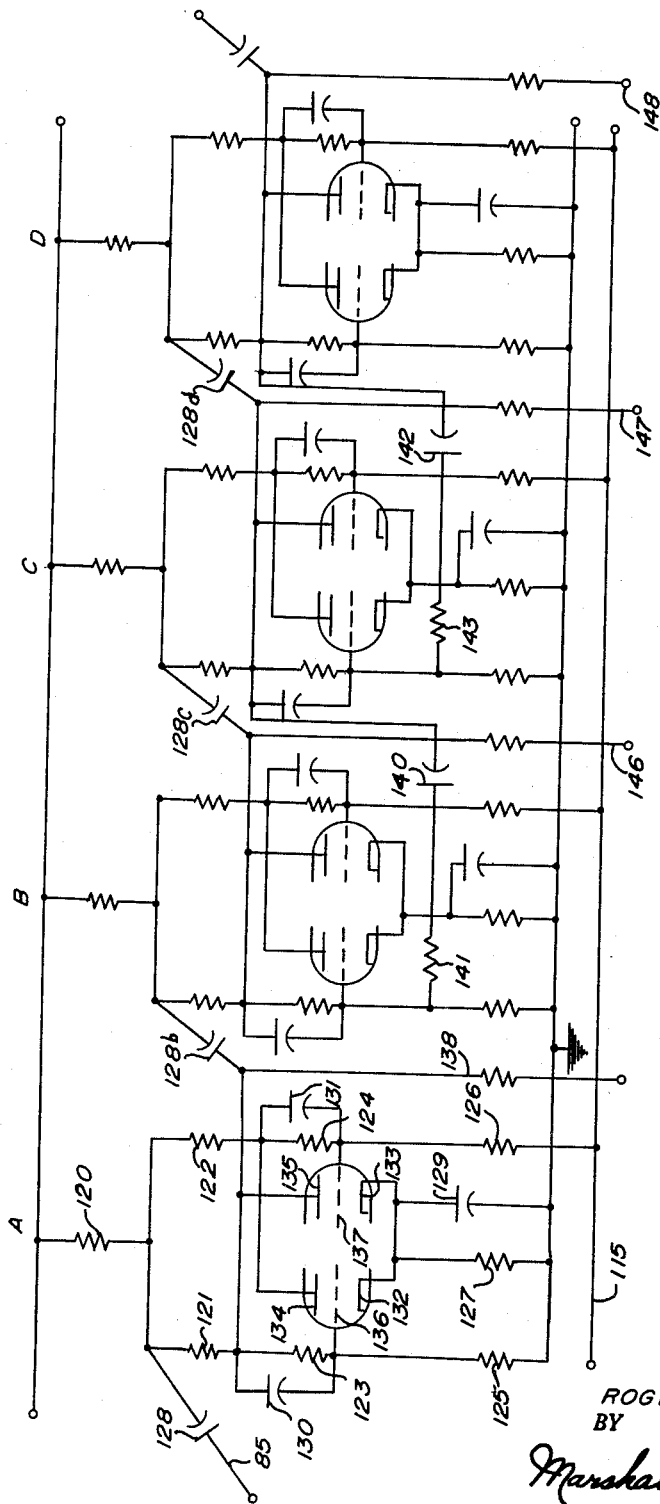

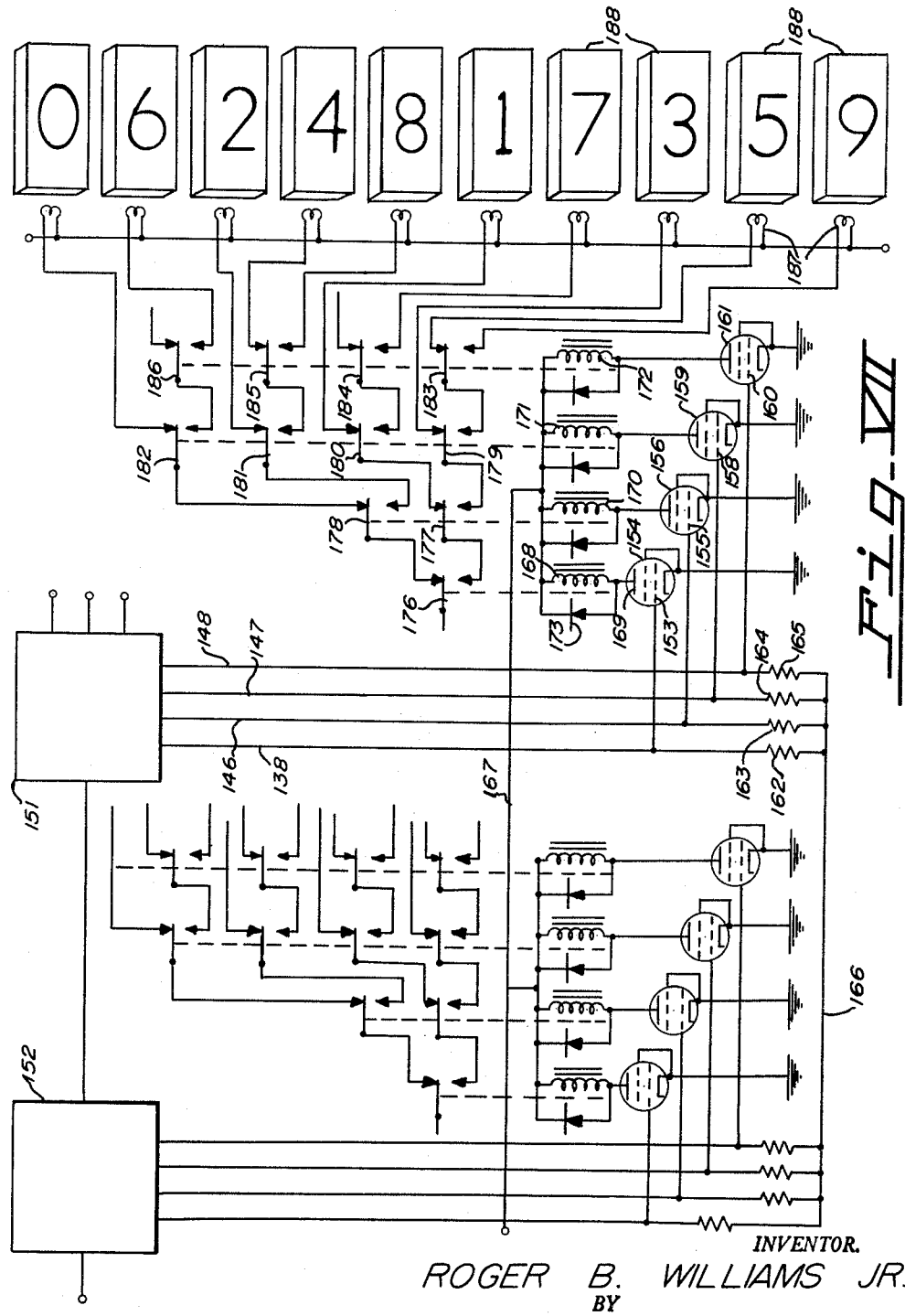

United States Patent Office 3,052,409
Patented Sept. 4, 1962

3,052,409
READ OUT EQUIPMENT FOR ELECTRONIC COUNTERS
Roger B. Williams, Jr., Toledo, Ohio, assignor, by mesne assignments, to Toledo Scale Corporation, Toledo, Ohio, a corporation of Ohio
Filed June 21, 1956, Ser. No. 592,938
11 Claims. (Cl. 235—92)

This invention relates to electronic counters and in particular to display means for counters that repetitively count the number of pulses in a series representing a condition under observation.

Electronic counters are commonly used to count events represented by electrical voltage pulses that occur at rates too rapidly to be identified and counted by mechanical or electromechanical counters. If the series of electrical pulses to be counted and indicated occur as discrete series of pulses separated by appreciable time intervals during which a counter can be read, ordinary electronic counters with neon light or other type of indication may be used and the counter read at the end of each cycle of pulses. Electronic counters are often used to counter the number of pulses in each of a series of recurring pulse trains which in some cases occur with a very short or no time interval between the termination of one train of impulses and the start of the next. If an indication is desired all of the pulses cannot be counted in these latter type cases because there is no time available for reading the counter between the finish of one train of pulses and the start of the next.

The principal object of this invention is to provide electronic means for reading a counter at the termination of a train of pulses and displaying such indication until the completion of the count of the next train or series of pulses. Thus the indicating portion of the counter continuously indicates the total of the last train of pulses and is corrected at the end of each train of pulses so as to display the corrected indication during the counting of the next train of pulses.

Another object of the invention is to provide means for electronically determining the start and finish of an arbitrary series of pulses and controlling circuits to transfer the indicated count of the counter to the indicating mechanism at the completion of each series of pulses and prior to the start of the next series.

A further object of the invention is to provide a circuit that serves to reset the electronic counter to a predetermined reading, which may be some arbitrary value or zero, at the start to each series of pulses to be counted.

More specific objects and advantages are apparent from the following description of a preferred form of the invention.

According to the invention each stage of an electronic counter used to indicate or count the number of pulses in a train of pulses is provided with an auxiliary storage or memory circuit that is adapted to operate an indicating mechanism. At the end of each series or train of pulses the memory circuits are momentarily associated with the counter stages and assume conditions indicative of the count then existing in the electronic counter. The counter is then reset and counts the pulses in the next train of pulses to be indicated. At the end of such series of pulses the memory circuits are cleared and immediately reconnected momentarily to the counter to register the new count as registered in the counter at that instant of time. After transferring the count to the memory circuits and prior to the start of the next series of pulses the counter itself is reset to zero in anticipation of the next count cycle. Various forms of memory circuits such as cold cathode grid controlled discharge tubes, thyratrons, bi-stable multivibrators or flip-flops, or magnetic core devices may be used in the storage circuits. A preferred form of the memory device is the ordinary thyratron since it may be triggered to its indicating condition in an extremely short time and with very little power and since it can continuously control sufficient power to directly actuate a visual display mechanism.

A preferred form of the invention is illustrated in the accompanying drawings.

In the drawings:

FIGURE I is a front elevation with parts broken away showing a conventional weighing scale load counter balancing and indicating mechanism equipped with a photoelectric scanning device for repetitively generating a series or train of pulses in which the number of pulses in each series is representative of the load then being indicated by the weighing scale.

FIGURE II is a view, at enlarged scale, of an indicating device located at a reading station and illustrating the type of indication available according to this invention.

FIGURE III is a horizontal section, as seen from the line III—III of FIGURE I, of the essential parts of the scanning device shown near the top of FIGURE I.

FIGURE IV is a fragmentary elevation of the chart and masked used in the scanning device substantially as seen from the line IV—IV of FIGURE III.

FIGURE V is a schematic wiring diagram of the amplifier and auxiliary control circuits for operating an electronic counter according to the invention.

FIGURE VI is a schematic wiring diagram of one decade of an electronic counter suitable of use according to the invention.

FIGURE VII is a schematic wiring diagram showing a preferred form of memory circuit connected to various counter decades and and arranged to operate the indicating mechanism suggested in FIGURE II.

These specific figures and the accompanying description are intended merely to illustrate the invention but not to impose limitations on its scope.

The series of pulses to be counted may be generated in any of a number of different ways and may represent different quantities. For example, the speed of rotation of a rotating shaft may be indicated by providing a reluctance generator or similar device to generate a given number of cycles, usually sixty, for each revolution of the shaft. These pulses are counted for one second intervals and the number of pulses counted for any second is equal to the speed of the shaft in revolutions per minute. In this type of application the start and finish of each series of pulses is determined by a clock circuit providing start and stop signals spaced exactly one second apart. The series of pulses may also indicate time intervals required for the occurrence of a certain event or events. In this case a pulse generator operating at a constant frequency supplies pulses which are counted during the time interval in question. Thus if pulses are generated at the rate to 100,000 per second, the time can be measured to .00001 second.

The pulses may also be used to indicate the magnitude of a condition or the position of a condition responsive member, in which case a scanner or equivalent mechanism is employed to generate a train or series of pulses in which the number of pulses is proportional to the displacement of the condition responsive member from its zero or neutral position. This type of equipment may be used in a weighing scale, for example, to provide remote indication of weight and to provide an indication of weight which is suitable for digital recording or for controlling calculating equipment.

When used in connection with a condition responsive member or instrument such as a weighing scale it is convenient to generate the pulses by means of a stationary graduated chart and scanning device which may be photoelectric in nature. A mask carried by the condition responsive member is arranged to variably eclipse the stationary chart so as to expose only a number of graduations corresponding to the indication of the instrument. The scanning of these exposed graduations produces the train or series of pulses to be counted. Switches may be included in the scanning device to signal the start and completion of each scan. Since the scans may occur at a relatively rapid rate in the order of four or five or more per second and since it is desirable to have as continuous an indication as possible, use is made of storage circuits in connection with the electronic counter that counts the pulses so as to store the indication in displayable form during each scan of the stationary chart and then at the end of each scan, in a very short period of time, transfer the indication to the new reading obtained by the last scan. This reading is then held during the next scan and until a new reading is thus obtained.

For purposes of illustration a weighing scale equipped with a scanner has been selected as an example of a condition responsive instrument equipped with means for generating trains or series of pulses wherein each series is indicative of the load on the condition responsive member. As shown in FIGURE I a weighing scale mechanism 1 is enclosed within a dial shaped housing 2 and includes a pair of pendulums 3 and 4 that are supported by flexible ribbons in a well known manner from a sector guide 5. Load forces applied to the mechanism through a steelyard rod 6 cause, as is well known, the pendulums 3 and 4 to swing outwardly and upwardly thereby elevating or raising compensating bars 7 pivotally connected to the centers of rotation of the pendulums 3 and 4. The upward movement of the compensating bars 7 is transmitted to a rack 8 that meshes with a pinion, not shown, arranged to drive an indicator shaft on which an indicator 9 is mounted. The indicator 9 cooperates with indicia of a chart 10 to indicate the magnitude of the load being counterbalanced.

The geometry and dimensions of the system are arranged so that the upward movement of the compensating bar 7 is precisely proportional to the load being transmitted to the pendulums 3 and 4 through the steelyard rod 6.

The upward movement of the compensating bar 7 is also transmitted through an upwardly directed rod 11 to a scanning mechanism 12 that is mounted on top of the dial housing 2. The scanning mechanism 12, also shown in FIGURE III, includes a stationary transparent chart 13 that is partially eclipsed or masked by a mask 14 carried on the rod 11.

The rotating member 15 carries part of an optical projection system that is arranged to scan the transparent chart 13 and project images of the exposed graduations to a photoelectric cell. The member 15 is driven by a motor 16 through a belt 17 so as to provide as uniform a motion as possible.

FIGURE II illustrates the type of indication that may be made available with the electronic equipment constructed according to the invention. As shown in this figure, a simple rectangular panel 20 has a number of windows 21 equal to the number of decades or places to be indicated. Suitable mechanism such as rotatable numeral wheels or in a preferred form illuminated stationary numerals are employed to display the indication. In a preferred form of indicating mechanism a plurality of transparent plastic sheets are stacked behind each window 21. Nine or ten such sheets are employed in each case and each sheet has engraved therein the numeral that it is to display. Small electric lamps or light bulbs are arranged to edge light these, there being one bulb for each sheet. Thus when the selected bulb is energized to illuminate its particular sheet, that sheet of plastic is filled with light and because of its smooth surfaces the light escapes only through the engraved portions representing the outline of the numeral to be indicated. This light passes through the other sheets and is visible from the front of the panel.

A suitable form of scanning mechanism such as was indicated in FIGURE I and suitable for use with a condition responsive member is illustrated in greater detail in FIGURE III. As indicated in FIGURE III, an optical system for scanning a stationary partially eclipsed graduated chart comprises a light source 25 mounted from a fixed stationary support and inserted into a hollow bore 26 of a rotating turret 27 of the scanning device. The turret 27 is carried on bearings 28 mounted on a stationary axle 29 fixedly supported from a frame member 30. Light from the light source 25 passes radially outwardly through condensing lenses 31 mounted in radially directed arms 32 of the turret 27. After passing through the condensing lenses the radially directed light beams are reflected by mirrors 33 mounted on the arms 32 so as to direct the rays of light from the light source through the stationary chart 13 as the arms sweep past the chart.

Projection lenses 34 mounted in radially directed arms 35 of the turret 27 receive the light reflected from the mirrors 33 and directed through the chart 13 and focused images of the chart graduations after reflection from a stationary mirror 36 onto a photocell 37. The optical axis from the condensing lenses 31 and mirror 33 through the projection lens 34 is not parallel to the axis of rotation of the turret 27 but is convergent to such axis so that if it were not for reflection from the stationary mirror 36 the images would be focused on a plane at the intersection of the optical axis and the axis of rotation of a turret. This relationship is maintained after reflection by the stationary mirror 36 to the photocell 37 so that the images of the graduations as projected by the projection lens 34 remain accurately parallel to each other and to a slit in a mask on the face of the photocell 37. As the turret 27 rotates the projection lenses pass successively along a path parallel to and adjacent the chart 13 while maintaining their distance so that the magnified images of graduations are sharply focused on the photocell 37 as they sweep past the photocell.

The mask or shutter 14 that is carried by the rod 11 is arranged between the chart 13 and projection lenses 34 and as close to the chart 13 as is possible to mount it and still avoid friction between the shutter and the chart.

FIGURE IV is a vertical elevation of the chart 13 and a portion of the shutter 14 to show the location of the graduations on the chart and their positions relative to the path of the optical axis during a scanning operation. The graduations 40 are thin transparent lines separated by opaque lines and extend transversely to the direction of movement of the shutter 14. The path of the optical axis is indicated by a dotted line 41 and as indicated follows an arc of a circle lying in the plane of the chart. For convenience and as a compromise between maximum length of scan or time of scan for a given speed and allowable width of the chart 13 the scan is limited to approximately 90° of rotation of the turret. Thus if the chart has a graduated length of approximately two inches the radius of the turret 27 from its axis of rotation out to the projection lens should be in the order of 1.4 to 1.5 inches.

In this arrangement the frequency of the generated pulses is not precisely uniform during a scan but rather starts at a certain frequency as the optical axis crosses the lines at an angle then rises to a maximum frequency near the center of the chart when the axis crosses at approximately right angles and then decreases again to approximately seven-tenths of the maximum frequency as the optical axis passes the full capacity end of the chart. For most counting operations this change in frequency is negligible and has no effect whatsoever on the accuracy of the count.

Switches, which are not shown in the drawing, may be arranged to be operated by the turret 27 as each of the lenses approaches the lower end of the chart when moving in the direction of the arrows to indicate the start of scan and to be operated when the optical axis leaves the upper end of the chart to thus indicate the end of scan.

Alternatively electronic means responsive to the pulses generated in the photocell 37 by the scanning of graduations may be employed to indicate the start and end of a scan. This is done by employing the first pulse to be generated at the start of a scan to reset the counters and thus prepare the circuit for counting. Furthermore the absence of pulses for a brief interval of time, which is long compared to the time between pulses, is used to indicate the end of scan. When an electronic system is used as indicated in FIGURE V to indicate start and end of the train of pulses there is danger that if the condition responsive member returns to zero at a relatively rapid rate and then takes the position slightly behind zero there are no graduations exposed and therefore no pulses and the indicator continuously indicates the last reading which was taken during the return toward zero. Thus the indication might not correspond with the actual position of the condition responsive member. To avoid this difficulty the chart 13 is provided with a single graduation 42 separated from the others by a sufficient distance so that it is never obscured or masked by the shutter 14 even through the condition responsive member does not return precisely to zero but hangs on the side below zero. The scanning of the graduation 42 provides the reset pulse so that the counter and indication is definitely returned to zero count even though the zero graduation is masked.

Suitable circuits for amplifying the output of the photoelectric cell 37 and shaping the pulses for operation of electronic counter and other control equipment are illustrated in FIGURE V. As shown in this figure the photoelectric cell 37 and a simple preamplifier are mounted in a case or chassis 50 that is conveniently mounted in the scanning device itself to eliminate any long leads carrying signals at high impedance levels. Voltage pulses from the scanner preamplifier are transmitted over a lead 51, coupling condenser 52 and grid current limiting resistor 53 to a grid 54 of an amplifier 55. The junction between the coupling condenser 52 and resistor 53 is connected to ground through a grid leak resistor 56. The scanner preamplifier is supplied with voltage through a lead 57 and is connected to ground through a return lead 58. The amplifier 55 is preferably a pentode having its cathode 59 connected to a voltage divider comprising resistors 60 and 61, the resistor 60 being by-passed with a condenser 62. The tube has its screen grid 63 connected directly to a B+ lead 64. A plate 65 is connected through plate resistor 66 to the B+ lead 64 and is also connected through a coupling condenser 67 and grid current limiting resistor 68 to an input grid 69 of a trigger circuit 70. The average potential of the grid 69 of the trigger circuit 70 is maintained positive with respect to a grounded lead 71 by a pair of resistors 72 and 73 forming a voltage divider between the B+ lead and ground.

The trigger circuit 70 is of the type commonly known as a "Schmidt" trigger circuit and is arranged so that it delivers rectangularly shaped output voltage pulses corresponding to the generally sinusoidal voltage pulses supplied to the grid 69. The trigger circuit comprises a dual triode tube having cathodes 74 and 75 connected through a cathode resistor 76 to the grounded lead 71, and plates 77 and 78 connected to the B+ lead through plate resistors 79 and 80. The plate 77 is also connected through a parallel combination of resistor 81 and condenser 82 to a control grid 83 of the second triode section and it is in turn connected through resistor 84 to ground. Preferably the plate resistor 80 has approximately two-thirds the resistance of the plate resistor 79.

In the absence of input signals the trigger circuit 70 is conditioned with the left triode, the plate 77 and cathode 74 drawing current with the grid 69 slightly positive with respect to cathode 74. The plate 77 is thus at its least positive potential and the grid 83 is driven sufficiently negative with respect to the cathode 75 to cut off the flow of current through the second triode. Voltage pulses from the scanner preamplifier by driving the amplifier control grid 54 positive produces a negative voltage pulse at the grid 69. This tends to cut off the flow of current through the left triode section of the trigger circuit thus raising the potential of the plate 77 and grid 83 thereby producing current flow through the right triode section and a negative going voltage at the plate 78. This negative going voltage signal is transmitted through an output lead 85 to the electronic counters that are employed in the over-all system.

A positive feedback occurs from the second triode section to the first by reason of the cathode resistor 76 and the fact that the plate resistor 80 is of less resistance than the plate resistor 79. Because of this positive feedback the output signal on the lead 85 tends to change extremely rapidly from one voltage level to another as the grid 69 is slowly changed in potential according to the incoming signal from the scanner. The rapidly changing signal on the output lead 85 may be differentiated by a well known resistance-capacitance circuit to provide the sharp voltage pulses required for operation of electronic counters.

The amplified and shaped voltage pulses appearing on the output lead 85 are also transmitted through a series resistor 86, condenser 87 and crystal diode rectifier 88 to charge the condenser 89 in the negative direction as long as the pulses persist. A high resistance 90 connected between the junction of the diode 88 and condenser 89 and the B+ lead continually tends to charge the condenser positively. The junction between the condenser 87 and diode rectifier 88 is connected to ground through resistor 91 so as to establish a reference potential for the input side of the diode 88, the terminal corresponding to the cathode of an ordinary rectifier. The average or static potential to which the condenser 89 is charged is determined by the relative magnitude of the resistors 90 and 91 connected between the B+ lead and ground by way of the diode 88. Since current tends to flow through this circuit in the conducting direction of the diode there is practically no voltage drop across the diode and the potential of an input grid 93 of a second trigger circuit 92 is determined almost entirely by the resistors 90 and 91. These are adjusted so that the trigger circuit 92 is normally in condition with the grid 93 drawing current.

The trigger circuit 92 is provided as means for determining the start and finish of a train of pulses. For this purpose the scanning of the initial or separate graduation 42 of the chart produces a first pulse which triggers the trigger stage 92 to its second condition thereby providing an output signal that may be used to reset the counter. Likewise at the end of the series of pulses, that is when there is an absence of pulses, the grid 93 returns to its normal condition as the condenser 89 is recharged and when the trigger circuit reverses it provides the signal to the auxiliary storage circuits to clear them of any previously stored information and allow them to be reset according to the count last accumulated in the counter.

The trigger circuit 92 is similar to the circuit 70 in that it comprises a pair of triodes each of which has its cathode 94 connected to ground through a cathode resistor 95 has a pair of plate resistors 96 and 97 connected to the left and right plates respectively and has the left plate connected through a parallel combination of a resistor 98 and condenser 99 to a control grid 100 of the right triode which is also returned to ground through a grid resistor 101. The output voltage of the trigger circuit 92 which appears on its output lead 102 consists of a sharp negative going voltage step at the start of the scan or when the single graduation of the chart is scanned, the voltage remaining at its negative step until the absence of pulses on the counter lead 85 indicates the end of scan, when the trigger circuit 92 recovers and the voltage sharply rises on the output lead 102.

The initial negative going step of voltage on the lead 102 is used to generate or initiate the generation of a resetting signal by way of a blocking oscillator 103. The blocking oscillator 103 comprises a triode section having cathode 104, control grid 105, plate 106 as well as a transformer 107. The cathode, grid and plate, 104 to 106, is half of a twin triode, the other triode section, comprising cathode 108, and plate 109, is operated as a grounded grid amplifier since its grid 110 is connected directly to ground. Its cathode 108 is connected to ground through resistor 111 and is connected to the output lead 102 of the trigger circuit 92 by way of condenser 112. The plates 109 and 106 are tied together and a damping resistor 113 is connected in parallel with the primary winding or plate winding of the transformer 107. The negative going step of voltage on the trigger circuit output lead 102 drives cathode 108 negative thus drawing current through the plate winding of the transformer 107. This current flow generates a voltage in the grid winding of the transformer 107 tending to drive the grid 105 positive thus increasing current flow through the plate 106. This action is accumulative and is limited only by the saturation characteristics of the tube. When the tube reaches saturation and the current is no longer increasing there is no longer any voltage generated in the grid winding of the transformer 107 and the grid 105 returns to its normal negatively biased condition. This causes current cutoff through the tube. The pulse of current through the blocking oscillator which flows through its cathode resistor 114 provides a positive voltage pulse on an output lead 115 which is employed to reset any electronic counters used in the system.

One decade of an electronic counter suitable for use in this equipment is illustrated in FIGURE VI. Such a counter comprises four stages of binary flip-flops or bistable multivibrators connected to operate in sequence and arranged with certain feedback connections so that ten input pulses results in one complete cycle of operation including one carry signal to a following decade. Each of the four stages of the binary decade are identical and each comprises a common plate resistor 120, individual plate resistors 121 and 122, plate to grid resistors 123 and 124 and grid to ground resistors 125 and 126. In addition there is a cathode resistor 127, an input coupling condenser 128, a cathode by-pass condenser 129 and plate to grid condensers 130 and 131. Each binary stage includes a twin triode having its cathodes 132 and 133 connected to ground through the cathode resistor 127, having a left plate 134 connected to the junction between the resistors 122 and 124 and having a right plate 135 connected to the junction between the resistors 121 and 123. A left grid 136 cooperating with the cathode 132 is connected at the junction between the resistors 123 and 125 and a right grid 137 is similarly connected to the junction between the resistors 124 and 126. When this circuit is assembled with the proper values for resistors and condensers it is bistable in that it will assume a state where either triode section may be conducting current and the other cut off. Suitable resistance values for the various resistors are, for the common plate resistor 120, 25,000 to 30,000 ohms; for the individual plate resistors 121 and 122, 45,000 to 50,000 ohms; for the plate to grid resistors 123 and 124, 250,000 to 300,000 ohms; for the grid to ground resistors 125 and 126, 100,000 ohms; and for the cathode resistor 127, 12,000 to 14,000 ohms. The input condenser 128 and the plate to grid condensers 130 and 131 are preferably in the order of 50 micro-microfarads while the cathode by-pass condenser 129 is in the order of $\frac{1}{100}$ of a microfarad.

For resetting purposes the right grid return resistor 126 is connected to the lead 115, the output lead of the blocking oscillator, rather than directly to ground. Ordinarily the cathode resistor of the blocking oscillator is in the order of 200 ohms so that for normal counting operations the circuit behaves as if the resistor 126 were connected directly to the grounded lead. When the blocking oscillator executes a cycle of oscillation in response to an input signal the positive voltage applied through the lead 115 drives the right control grid 137 positive so as to draw current through the right half of the twin triode thereby establishing that as the conducting side. This action also causes the left side to become non-conducting and since this is the normal starting condition of the tube it is termed non-conducting when in this state. The application of the next voltage pulse through the lead 85 and coupling condenser 128, by driving the plates negative and then allowing them to return to their normal potential, causes the current conduction condition to transfer to the opposite sections of the twin triode thereby having the left side conducting and the right non-conducting. When the right side is non-conducting the plate 135 is at its maximum potential thereby applying a positive voltage to an output lead 138 that is connected to the data storage circuits or indicating mechanism. The plate 135 is also connected through a coupling condenser 128b for the next stage of the binary counter.

When the second voltage pulse is received through the input conductor 85 the current conducting condition of the first stage A is again reversed or returned to its original condition thereby causing current conduction through the plate 135 thus sharply dropping its potential. This drop in potential transmitted through the coupling condenser 128b to stage B causes a change in current conduction in the second stage.

Likewise successive pulses cause alternate changes in state of conduction in each of the various stages. Thus stage A changes at every pulse received and goes through a cycle for two pulses, stage B goes through a cycle for each two pulses received from stage A or every four cycles received on the input conductor 85. Likewise stage C goes through one cycle for every eight impulses and stage D one cycle for every sixteen impulses. In order that the counter may count by tens instead of by sixteens feedback connections are arranged from stage C, the third stage, back to stage B and also from stage D to stage C. The feedback connection from stage C to stage B is by way of condenser 140 and resistor 141 connected between the right hand plate of stage C and the left hand grid of stage B. Likewise a feedback circuit is connected from the right hand plate of stage D through condenser 142 and resistor 143 to the left hand grid of stage B. In this arrangement when stage B completes its cycle at the end of the fourth impulse and transmits a negative impulse through coupling condenser 128c to stage C, stage C operates from its nominally non-conducting state to its conducting state thereby providing a positive impulse which is fed back through the condenser 140 and resistor 141 to the left-hand grid of stage B thereby returning it to its conducting condition whereas normally it would have been left at this time in its non-conducting condition. Thus at the end of four pulses on the input lead 85 the decade is left with stages B and C in conducting condition and stages A and D non-conducting. After the receipt of two more impulses stage A will again have tripped stage B so that it transmits a negative impulse to stage C which thereupon is tripped to its non-conducting condition or original condition thereby transmitting a negative impulse through condenser 128d to stage D so as to trip it to its conducting condition with current flow through its left section. Upon the start of such current flow a positive pulse is transmitted back through condenser 142 and resistor 143 to the left grid of stage C thereby resetting it to its conducting condition. Thus at the end of six impulses stages C and D are in their nominally conducting condition while stages A and B are non-conducting. The next four pulses cycle stages A and B through their normal sequence of operation, the fourth pulse being transmitted from stage to stage to reset the entire decade to its original condition. Thus the decade completes a complete cycle of operation for ten input pulses.

The condition of each of the counter stages may be sensed electrically on output leads 138 from the first stage, 146 from the second stage, 147 from the third stage and 148 from the fourth stage. These output leads are connected through one megohm resistor to the right hand plates of the various stages and thus because of the high resistance in series may be connected to indicating mechanism without affecting the operation of the counter itself.

The count stored or accumulated in the various decades of the electronic counter at the end of each train of pulses is transferred to storage circuits which operate indicating mechanism to indicate the count while the counters are reset and are counting the next series of pulses. The storage circuit and one form of indicating mechanism is illustrated in FIGURE VII. Two decades 151 and 152 of an electronic counter are selected for illustration as representative of any number of decades. These may be the units and tens or any other order of the electronic counter. Each decade is handled individually and controls its own indicating mechanism. As shown the decade 151 representing the circuit shown in FIGURE VI has its output leads 138, 146, 147 and 148 connected respectively to control grids 153 of a first thyraton 154, control grid 155 of a second thyratron 156, control grid 158 of a third thyratron 159 and control grid 160 of a fourth thyratron 161. Thyratrons are selected as storage circuit tubes because of their characteristic of maintaining current discharge once it is started and being resettable only by interruption of such current flow. Other types of memory circuits may also be employed so long as they have the characteristic that they may be quickly or instantly reset and controlled with extremely small amounts of power.

The grids of the thyratrons thus connected to the output leads respectively are also individually connected to a bias lead through one megohm resistors, 162 for the thyratron 154; 163 for the thyratron 156; 164 for the thyratron 159 and 165 for the thyratron 161. The return resistors are connected to a return or bias line 166 that is held at a sufficiently negative voltage with respect to the grounded cathodes of the thyratrons to normally maintain plate current cutoff in the thyratrons regardless of the condition of the various stages of the counter to which the grids are connected. The plate circuits of the thyratrons 154, 156, 159 and 161 are fed from a thyratron voltage supply lead 167 and each includes a relay in its plate circuit. Thus a relay 168 is connected between the lead 167 and a plate 169 of the thyratron 154. Likewise relays 170, 171 and 172 are connected in the plate circuits of the thyratrons 156, 159 and 161 respectively. Each of the relay coils is by-passed with a diode rectifier such as a rectifier 173 connected in parallel with the coil of the relay 168. The rectifiers prevent the inductive surge of voltage in the coils which would otherwise make it difficult to deenergize the thyratrons by momentary reduction in voltage on the supply lead 167.

The relays have contacts arranged in matrix form so as to connect ten output leads selectively according to the combination of relays operated to correspond to conducting stages in the counter. Thus the relay 168 has a single-pole double-throw set of contacts 176, the relay 170 has a double-pole double-throw set of contacts 177, 178, the relay 171 has four-pole double-throw contacts 179, 180, 181, 182 while the remaining relay 172 has four-pole double-throw contact assemblies 183, 184, 185 and 186. As shown in this figure the contacts are arranged to selectively conduct current to a series of indicator lights 187 arranged to edge light a series of transparent plastic plates 188 which are individually engraved with indicia corresponding to the various digits to be indicated.

The circuit for any of the indicating lights 187 may be traced through the matrix from the first set of contacts 176 to the light corresponding to the relays which are energized. Thus if the counter stands at 1 or indicates 1 only the first relay is energized so that current flows through the lower contact of the assembly 176 thence through the upper contacts of the relay contacts 177, 180 and output lead to the light associated with the number 1 indicia plate. Likewise if the count is 9 so that all of the counter stages are energized all of the relays are also energized and current flows from the contact assembly 176 through the lower contact of this assembly and the lower contacts of assemblies 177, 179, 183 to energize the lamp associated with the number 9 indicator plate.

While the stacked transparent plastic plates, edge lighted by lamps energized according to the count provide a simple, practical type of indication other types of indication may also be employed and operated or energized by way of the relay contact matrix according to the count stored by the thyratron storage circuit.

A second decade including the thyratrons, relays and relay contact matrix are also indicated in FIGURE VII to illustrate the parallel nature of the indicating assemblies. Thus the second set of thyratrons are also energized from the supply lead 167 and have their grid circuits returned to the grid bias lead 166. As many sets of memory circuits may be added as may be required by the number of decades employed in the electronic counter, it being understood that each decade would have its individual set of indicating plastic plates and indicating lights.

The circuits for resetting the thyratron storage circuit at the end of each scan or train of pulses are illustrated in the lower part of FIGURE V. It will be recalled that at the start of each train of pulses the counter was reset by the pulse delivered by the blocking oscillator 103 on its output lead 115. At the start of the series or train of pulses the output lead 102 of the second trigger circuit 92 was driven sharply negative with a step voltage and is maintained at the negative voltage or the negative end of the step of voltage during the duration of the series of pulses and then a short time later, as the condenser 89 is recharged, the lead 102 steps back to its original positive voltage condition. This negative going pedestal of voltage on the lead 102 is transmitted through a small coupling condenser 176 to input grid 177 of a monostable multivibrator 178. The input circuit to the monostable multivibrator 178 serves to distinguish or identify the positive step at the end of the train of pulses and separate it from the start signal. The multivibrator provides the time spaced pulses that are required for first deionizing or deenergizing the thyratrons, to prepare them for the next indication, and subsequently energizing the thyratron grids according to the potential or condition of the associated counter stages.

The multivibrator 178 comprises a dual triode having first and second cathodes 179 and 180 grounded through a common cathode resistor 187 and has its plates 182 and 183 connected through plate resistors 184 and 185 to a B+ supply lead 186. The input grid 177 is maintained at about 20% of the potential on the lead 186 by voltage divider resistors 187 and 188. The time constant of the condenser 176 which may be in the order of 300 micromicrofarads and the resistors 187 and 188 is such as to differentiate the voltage signal appearing on the lead 102. A control grid 189 cooperating with the cathode 180 and plate 183 is connected to the B+ lead 186 through grid resistors 190 and 191. Thus the right hand half of the tube comprising the cathode 180 and plate 183 normally draws plate current and since the resistance of the plate resistor 185 and the voltage drop across the cathode resistor is sufficient so that the left hand side of the tube is normally at current cutoff. Thus the plate 182 is normally at the same potential as the supply lead 186 while the plate 183 is at a considerably more negative potential which may be slightly more than one-third of the voltage appearing on the lead 186.

Upon receipt of the positive going step of voltage at the end of a series of pulses the left side of the multivibrator 178 becomes conducting so as to transmit a negative going signal voltage from its plate 182 through lead 192 and small coupling condenser 193 to a control grid 194 of a cathode loaded amplifier 195.

The cathode loaded amplifier 195 serves to establish the potential of the thyratron bias lead 166. This is accomplished since the amplifier 195 has its plate connected to a B+ lead 196 and has its cathode 197 connected through a cathode resistor 198 to a negative bias lead 199 held at approximately 250 volts negative with respect to ground. Thus the cathode 197 is operated at a potential negative with respect to ground and the actual value of the potential is controlled by the grid 194 which is connected through a grid resistor 200 to a voltage divider 201 connected between ground and the negative return lead 199.

The negative voltage signal applied through the lead 192 to the grid 194 has no effect except to increase the negative bias on the lead 166. However, the same voltage is applied to a second coupling condenser 202 to the junction between the grid resistors 190 and 191 and thus to the second control grid 189 of the multivibrator thus driving this grid negative to cut off flow of current through the right hand section of the tube and thus continue current flow through the left hand section. As current is cut off in the right hand section a positive voltage appears on a plate lead 203 connected to the plate 183 and this is coupled through a coupling condenser 204 to an amplifier tube grid 205 of an amplifier 206. The amplifier 206 has its plate resistor 207 connected to the positive supply lead 196 and has its plate also connected through a coupling condenser 208 to a grid 209 of a series tube 210 of a voltage regulating system. The series tube 210 controls the plate voltage applied to the lead 167 and thus to the thyratrons.

The voltage regulator tube 210 is part of a voltage regulating system having a glow discharge tube 211 serving as a voltage standard this tube being supplied with current through a resistor 212 connected to the positive supply lead 196 and serves to establish a definite voltage across voltage divider resistors 213 and 214. An amplifier 215 in a well known manner compares the voltage across the voltage divider resistor 214 with the voltage across a portion of a voltage divider comprising resistors 216 and 217 connected between the cathode 218 of the series regulator tube 210 and ground. The amplified difference voltage appearing at a plate 219 of the amplifier 215 is applied to the control grid 209 of the series tube 210 and serves to control the flow of current through such tube in order to maintain the selected potential on the lead 167.

When the end of train signal was received over the line 102 and amplified through the multivibrator 178 it appeared as a positive voltage on lead 203 which after amplification through the amplifier 206 appeared as an amplified negative voltage at the grid 209 of the series regulator tube 210. This amplified negative voltage, driving the grid negative, cuts off the flow of current through the series regulator tube 210 from the lead 196 and thus the potential on the thyratron supply lead 167 sufficiently to rob the thyratrons of plate voltage and thus permit them to be deionized.

This deionizing or robbing of the thyratrons of their plate voltage serves to clear them of any previous signals that may have been stored therein and constitutes a clearing of the storage circuits.

A short time later as the condenser 202 of the multivibrator 178 recharges the potential on the control grid 189 rises so that the multivibrator returns to its stable state thus driving the lead 203 negative to restore the voltage conditions at the tube 210 and also supply a positive going signal over the lead 192 from the plate 182 as the multivibrator resets. This positive signal transmitted through the coupling condenser 193 to the grid 194 of the amplifier tube 195 momentarily raises the potential on the lead 166 above its normal or static potential condition as determined by the voltage divider 201 and amplifier 195. This positive pulse occurring a short time after the thyratrons have been cleared is sufficient to reduce the bias on those thyratrons whose grids are connected to then positive plates of the associated counter decades to permit those thyratrons to fire. If the corresponding stage of the counter decade is in its non-conducting condition the potential on the output lead is sufficiently low so that the positive signal on the lead 166 cannot fire the associated thyratron. Thus, after resetting, the only thyratrons that are fired are those connected to then conducting stages of the counter. Thus the thyratrons are reset according to the counter indication or condition existing at the end of the count.

The time interval between the deionizing of the thyratrons by robbing them of their plate voltage and the subsequent positive pulse applied to the lead 166 is in the order of five milliseconds and is short enough so that, if the same reading is repeated, the relays in the plate circuits of the thyratrons do not have time to respond to the lack of current flow and thus remain in their energized condition. However if there is a change of indication between the previous and new reading only those relays will respond that are required to change their condition to go from the old to the new reading.

The pulsing circuit shown in the lower portion of FIGURE V may be replaced by switches or a commutator mounted on the scanning device and serving to signal the start and finish of a scan. However the electronic circuits, having no moving parts, are much more reliable when the instrument is used continuously over long periods of time.

Various modifications in the circuits and components may be made without departing from the scope of the invention or losing the advantages obtained by continuously indicating the result of a previous count during the taking of the next reading.

Having described the invention, I claim:

1. In an indicating system, in combination, means for generating a series of pulses in which the number of pulses is proportional to the quantity to be indicated, an electronic counter for counting the pulses, means responsive to the first pulse of each series of pulses for resetting the counter, a plurality of electronic storage circuits one for each stage of the electronic counter for storing during one series the count of the next previous series, and means operated by the storage circuits for displaying an indication, and means responsive to the end of a series of pulses arranged to reset the storage circuits according to the then existing condition of the associated counter stages.

2. In an indicating system, in combination, means for repetitively generating series of pulses in which the number of pulses in each series is proportional to the quantity to be indicated, an electronic counter for counting the pulses, means responsive to the presence of pulses for signaling the start and end of each series of pulses, means responsive to the start signal for resetting the electronic counter, a signal storage circuit for each stage of the electronic counter for storing during one series the count of the next previous series, means operated by the storage circuits for displaying an indication, and means responsive to each end of series signal adapted to immediately reset the storage circuits according to the then existing condition of the associated counter stages.

3. In an indicating system, in combination, means for repetitively generating series of pulses in which the number of pulses in each series is proportional to the quantity to be indicated, an electronic counter for counting the pulses, means responsive to the presence of pulses for signaling the start and end of each series of pulses, means responsive to the start signal for resetting the electronic counter, a gaseous signal storage tube for each stage of the electronic counter for storing during one series the count of the next previous series, means operated by the signal storage tube for displaying an indication, and means responsive to each end of series signal for clearing and resetting the storage tubes according to the count then registered in the electronic counter.

4. In an indicating system, in combination, means for generating a series of voltage pulses proportional in number to a quantity to be indicated, an electronic counter for counting the number of such voltage pulses, a signal storage tube for each stage of the electronic counter, means actuated by the signal storage tubes for displaying an indication, means responsive to the voltage pulses for signaling the start of a series of pulses to be indicated, said start signaling means being adapted to reset the counter, and means responsive to the end of the series of pulses adapted to clear the storage tubes and reset them according to the last count then in the counter.

5. In an indicating system, in combination, means for generating a series of voltage pulses proportional in number to a quantity to be indicated, an electronic counter for counting the number of pulses in a series, a gas discharge storage tube associated with each stage of the electronic counter, display means actuated by the storage tubes, means responsive to the first pulse of a series of pulses adapted to reset the counter, and means responsive to the absence of pulses at the end of a series of pulses adapted to clear the gas discharge tubes and immediately reset them according to the count then in the counter.

6. In an indicating system, in combination, means for generating a series of electrical pulses proportional in number to a quantity to be indicated, an electronic counter arranged to count the pulses in such series of pulses, a thyratron storage circuit for each stage of the electronic counter, means responsive to the first pulse of a series of pulses for resetting the counter at the start of each series of pulses, and means responsive to the absence of pulses at the end of a series of pulses for clearing the thyratron storage circuit and resetting the thyratron storage circuits according to the count registered in the counter at the end of such series of pulses.

7. In an indicating system, in combination, means for generating a series of electrical pulses proportional in number to a quantity to be indicated, an electronic counter arranged to count the pulses of such series of pulses, means responsive to the first pulse of a series of pulses for generating a signal pulse for such series of pulses, means responsive to such signal for resetting the counter, means responsive to the cessation of pulses for generating a voltage pulse after the end of such series of pulses, a signal storage circuit for each stage of the counter, display means operated by the signal storage circuits, and means responsive to the voltage pulse at the end of the series of pulses for clearing the storage circuits and immediately resetting such storage circuits according to the count in the counter.

8. In an indicating system, in combination, means for generating a series of electrical pulses proportional in number to the quantity to be indicated, an electronic counter arranged to count such pulses, electronic means responsive to the first pulse of such series of pulses and adapted to reset the counter, a plurality of gas tube signal storage circuits one for each counter stage to be indicated, display means actuated by the storage circuits, and electronic means responsive to the cessation of pulses at the end of a series of pulses adapted to clear the storage circuits and reset them according to the count registered in the counter.

9. In an indicating system, in combination, means for repetitively generating series of pulses in which each series includes a first pulse followed by pulses proportional in number to the quantity to be indicated, an electronic counter for counting the pulses, means responsive to said first pulse and to the cessation of pulses for signaling the start and end of each series, means responsive to the start signal for resetting the electronic counter, an indicating storage circuit for each stage of the electronic counter for indicating during one series the count of the next previous series, and means responsive to the end of series signal adapted to reset the indicating storage circuit according to the then existing count in the associated counter state.

10. An indicating system according to claim 9 in which the storage circuits include grid controlled gas discharge tubes.

11. An indicating system according to claim 9 in which the storage circuits include thyratrons having relays in their plate circuits.

References Cited in the file of this patent

UNITED STATES PATENTS

| | | |
|---|---|---|
| 2,375,665 | Koulicovitch | May 8, 1945 |
| 2,376,234 | De Castro | May 15, 1945 |
| 2,393,186 | Potter | Jan. 15, 1946 |
| 2,431,591 | Snyder et al. | Nov. 25, 1947 |
| 2,616,965 | Hoeppner | Nov. 4, 1952 |
| 2,761,968 | Kuder | Sept. 4, 1956 |
| 2,765,426 | Faulkner | Oct. 2, 1956 |
| 2,803,448 | Biebel | Aug. 20, 1957 |
| 2,841,334 | Abate | July 1, 1958 |
| 2,921,469 | Newton | Jan. 19, 1960 |
| 2,938,126 | Adler | May 24, 1960 |